July 12, 1960

D. N. MONTGOMERY 2,945,182

GALVANOMETER MOUNTING ARRANGEMENT

Filed Aug. 12, 1957

INVENTOR.
DONALD N. MONTGOMERY

BY

*Christie, Parker & Hale*
ATTORNEYS

July 12, 1960

D. N. MONTGOMERY 2,945,182

GALVANOMETER MOUNTING ARRANGEMENT

Filed Aug. 12, 1957

INVENTOR.
DONALD N. MONTGOMERY

BY

*Christie, Parker & Hale*

ATTORNEYS

INVENTOR.
DONALD N. MONTGOMERY

United States Patent Office 2,945,182
Patented July 12, 1960

2,945,182

GALVANOMETER MOUNTING ARRANGEMENT

Donald N. Montgomery, Glendora, Calif., assignor to Bell & Howell Company, Chicago, Ill., a corporation of Illinois Filed Aug. 12, 1957, Ser. No. 677,575

4 Claims. (Cl. 324—154)

This invention relates to galvanometers and more particularly to an arrangement for mounting a family of galvanometers.

In the use of torsional, mirror-type galvanometers, one of the major problems is the enclosure used to house the suspended element of a suspenison galvanometer. Where several such suspensions are used to determine time displacement of various signals there is also the problem of determining the relative time delays in each suspension. Groups of suspension galvanometers having either or both different sensitivities or different resonant frequencies are often used to obtain either the maximum displacement or a band of frequency response characteristics of certain phenomena. Where a group of suspension galvanometers having different characteristics are employed to measure the time phase, frequency or sensitivity-related response, errors in frequency response, phase angle of lag and the like are normally incurred, and errors introduced by the galvanometers themselves in any recorded readings often present a problem. A family of suspension galvanometers having substantially identical characteristics and free of unknown error are particularly valuable for making geophysical measurements, air frame measurements, electrical power station instrumentation and other measurements involving time related data.

It is often desirable to employ a plurality of galvanometers to make simultaneous measurements of several factors under investigation. In geophysical explorations, for example, it may be desirable to arrange a number of transducers in different locations in the earth and couple each transducer to a different galvanometer. If a test charge is set off, an output signal from each transducer may be coupled to an associated galvanometer and the galvanometer caused to rotate about its axis an amount which is proportional to the shock wave experienced by the associated transducer. Where each galvanometer is provided with a mirror, light reflected from the mirror may be recorded on a film or other recording medium. When a family of galvanometers have their light beams projected onto a common strip of film, it is easily seen that a family of similar curves representative of the pressure waves experienced by the various transducers is arranged for convenient comparison.

In prior known devices in which a plurality of galvanometers are housed, each galvanometer includes an individual housing arrangement mounted in a common block. In making plural measurements simultaneously with an arrangement of this sort, one problem encountered is galvanometer error resulting from the various galvanometers having different responses. In other words, the same signal applied to two different galvanometers having different characteristics results in a different phase angle of lag in each galvanometer. To the extent that the phase angle of lag is different in each an erroneous reading results when such galvanometers are employed for purposes of the type mentioned above. Accordingly it is desirable to provide a family of galvanometers having substantially identical characteristics so that each gives substantially the same response to like signals supplied as inputs thereto. Such galvanometers employed in geophysical work, for example, may then yield a family of curves which indicate the intensity of the shock wave at the various transducers, free and clear as much as possible of galvanometer error.

According to the present invention a unique mounting arrangement is provided for housing a plurality of suspension galvanometers having substantially identical characteristics. A large number of galvanometers may be installed per linear inch of magnet. Plug-in adaptation is easily obtained with this type construction which results in less wear in the actual suspension parts because of fewer handling operations. Easier installation of galvanometers into an oscillograph magnet is accomplished with much less danger of breakage, and hermetic sealing is easily adapted.

According to the present invention a plurality of recording galvanometers are suspended in a simplified mounting which holds a group of five or ten suspensions calibrated for certain known characteristics wherein the basic error in recording media is known. A simplified manufacturing technique permits less error because of the lack of an unknown factor of mechanical tolerances in fitting a body such as a coil and its suspension into a magnetic field. A common piece of magnetically soft, high permeability material may be employed to form a common magnetic pole gap for all galvanometer suspensions. The gap is cut with one machine and the faces of the gap are made sufficiently broad that standard tolerances in manufacturing will not materially affect the actual flux density of any one suspension over another.

The galvanometer suspension materials may be assembled so that very little change in total length of suspension, mass, moment of inertia or spring rate of the free length of the suspension occurs. Thus, the characteristic equation of a given suspension is noted by:

(1) $$F_n = k_1 \sqrt{\frac{K}{I}}$$

(2) $$h = \frac{k_2 S^2 f n K}{R}$$

(3) $$\theta = \tan^{-1} \frac{2hf}{1-f^2}$$

where $F_n$ = resonant frequency
$k_1, k_2$ = constants
$K$ = torsional spring rate
$I$ = mass moment of inertia
$S$ = sensitivity (inches per amp.)
$h$ = resistive damping factor
$R$ = circuit resistance
$f$ = $\frac{F}{F_n}$
$\theta$ = phase angle of lag Normally the factors of resonant frequency and resistive damping factor are difficult to hold constant, but the present arrangement permits almost identical response from a group of suspension galvanometers whereby accurate studies of time phase, frequency or sensitivity related responses may be secured with instruments of normal manufacturing tolerances.

By controlling the resistive damping factor $h$ which is a function of $R$, the total circuit resistance, Equations 2 and and 3 above indicate how the phase angle of lag is controlled. Minor adjustments in phase angle of lag at a given circuit resistance may be made in low frequency galvanometers by the use of oil in a small oil loop surrounding one of the suspension members. This changes the total damping factor by a small amount.

According to this invention each one of a plurality of suspension galvanometers includes an upper suspension, a lower suspension, a spring, a coil and mirror. The length of the upper and lower suspensions and the weight and size of the coil and mirror of each galvanometer are made substantially identical. Each galvanometer is provided with an eccentric cam at one end of its suspension which permits minor adjustment of the galvanometer in tilt, primarily a vernier adjustment made upon initial installation to insure that each galvanometer has the same tilt angle with respect to the others. Each galvanometer is suspended within a common mounting frame, and the frame includes provision for adjusting the tilt of the galvanometers collectively. Accordingly the mass, the tilt, moment of inertia and spring rate of each suspension is substantially the same.

Each of the suspension galvanometers includes a mechanism for adjusting the degree of tension desired. By adjusting the tension the resonant frequency of each suspension is varied. Slight differences in weight, length of suspension, inertia and the like may be partially compensated for by individually adjusting the tension of each suspension galvanometer upon calibration. If a standard signal is applied to each galvanometer as its tension is adjusted, the response of each galvanometer may be made almost identical. It is particularly desirable that the phase angle of lag for each galvanometer be as nearly identical as possible in response to the same input signal.

In an arrangement of this sort where a family of galvanometers are employed to measure simultaneously a number of factors, the actual phase angle of lag of each galvanometer is substantially identical because the physical dimensions and weight of corresponding parts in each suspension are made substantially the same and the tension of each suspension is adjusted to provide each galvanometer suspension with substantially the same resonant frequency. A family of suspension galvanometers having almost identical responses permits accurate studies of time phase, frequency or sensitivity related responses without the introduction of galvanometer error normally encountered in a group of randomly selected galvanometers because of their different responses.

These and other features of this invention may be more fully appreciated when considered in the light of the following specification and drawings in which.

Figure 1:
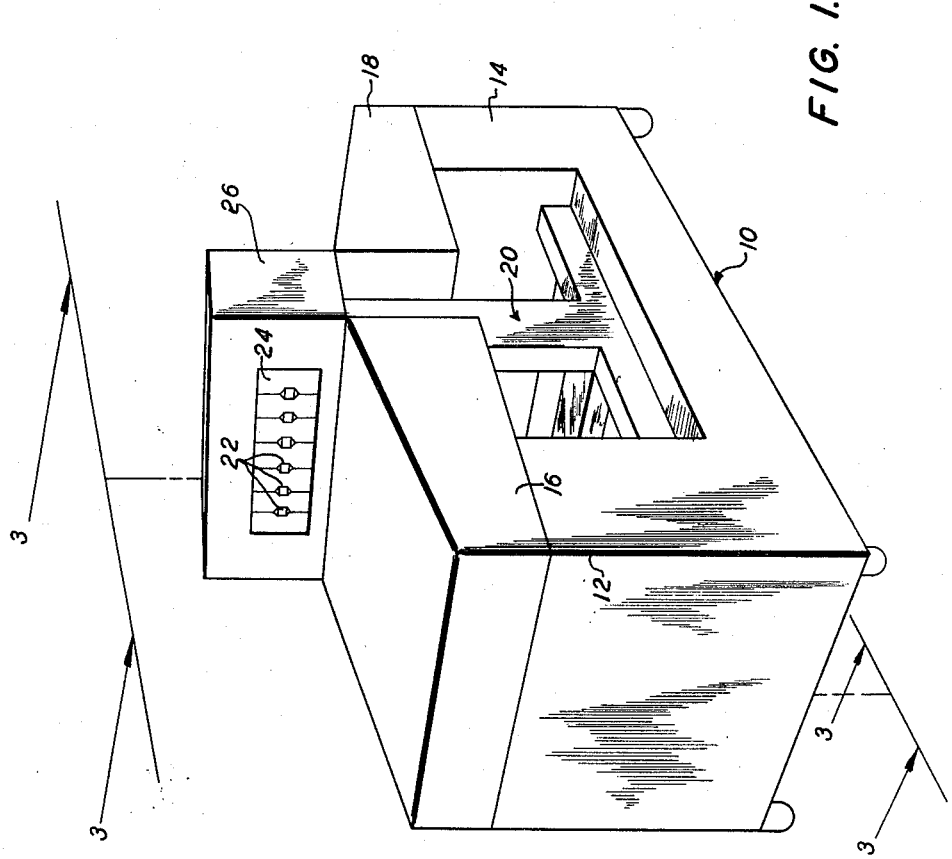
Fig. 1 is a perspective view of an arrangement for mounting a family of galvanometers.

Referring first to Fig. 1, a mounting arrangement according to this invention includes a magnet 10 having poles 12 and 14 on which are secured respective pole pieces 16 and 18. Between the pole pieces 16 and 18 a mounting frame 20 within which a family of mirror-type suspension galvanometers 22 are mounted. The mirrors 23 are visible through a window 24 in a cover 26 which may be a snap-on type cover, preferably made of material which is not ferro-magnetic.

Figure 2:
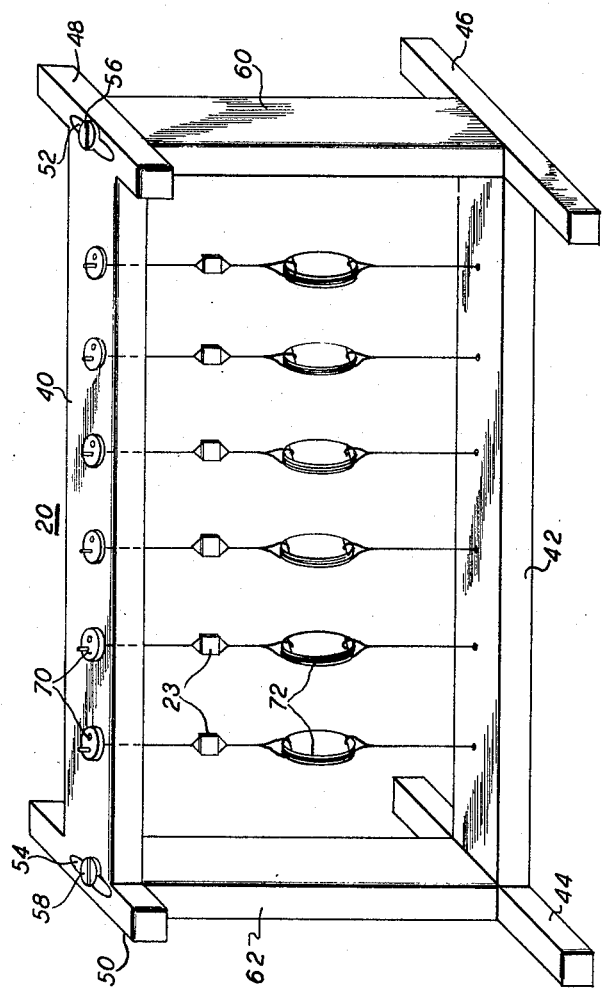
Fig. 2 is a perspective view of a frame for mounting a plurality of galvanometer suspensions.

If the cover 26 in Fig. 1 is lifted off, the mounting frame 20 may be removed by sliding it laterally from the magnet 10. The frame 20 is preferably constructed of material which is not ferro-magnetic. As shown in Fig. 2 the mounting frame 20 includes upper and lower suspension bars 40 and 42 between which the family of suspension galvanometers are mounted. The lower suspension bar 42 includes crossbars 44 and 46, the ends of which fit between the poles 12 and 14 of Fig. 1. The fit is sufficiently loose to permit the crossbars 44 and 46 to slide between the magnet poles 14 and 16, but the tolerance is such that the frame support 20 is not permitted to tilt about its vertical axis. The upper suspension bar 40 includes crossbars 48 and 50 having respective slots 52 and 54 therein. Threaded machine head screws 56 and 58 extend downwardly through respective slots 52 and 54 and engage tapped bores in the vertical support members 60 and 62. Each suspension galvanometer includes an eccentric cam 70 positioned on the top side of the upper suspension bar 40 which may be adjusted to correct for angle of tilt in a plane transverse to the suspension bar 40. The eccentric cams 70 serve as vernier adjustments which are normally used at initial installation to insure that each galvanometer is suspended vertically. This assures that each suspension is at the same angle with respect to the frame 20. Where it is desired to change the tilt of the family of galvanometers, the bolts 56 and 58 are loosened, the upper suspension bar 40 is moved transversely until the proper angle of tilt is secured, and the screws 56 and 58 are then tightened to maintain this angle. Each galvanometer suspension includes a mirror 23 and a coil 72 suspended between the suspension bars 40 and 42.

Figure 3:
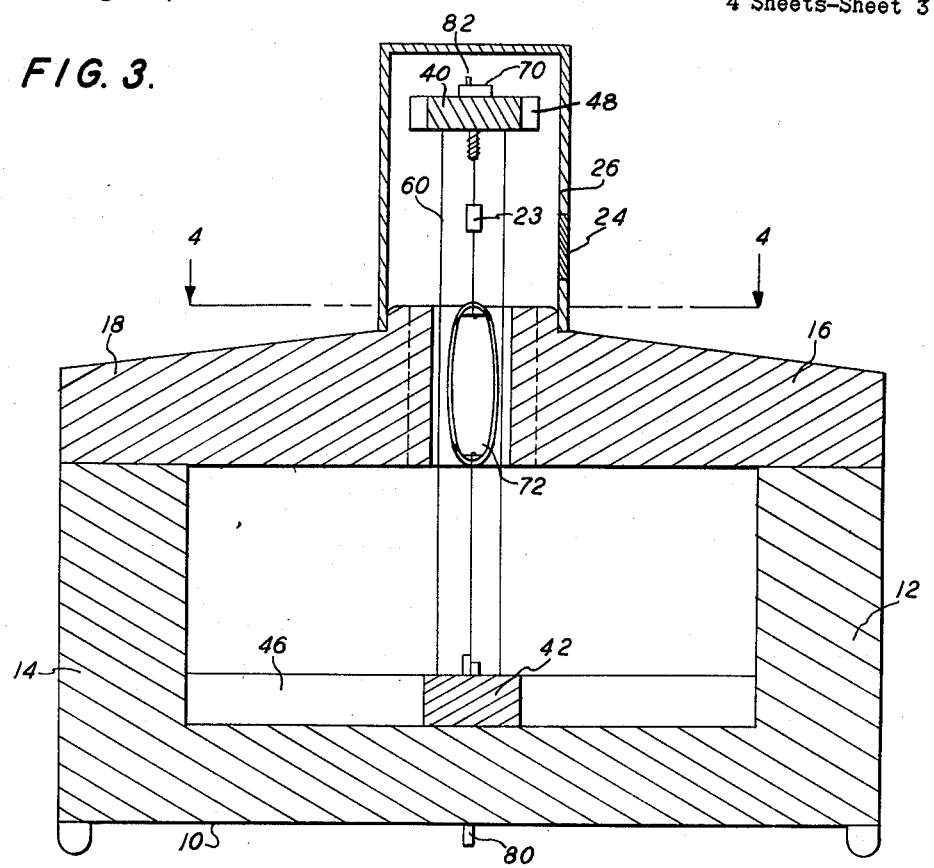
Fig. 3 is a cross-sectional view of the galvanometer mounting arrangement taken on the line 3—3 in Fig. 1.

Referring next to Fig. 3, a cross-sectional view along the line 3—3 of the assembly in Fig. 1 is shown. As easily seen in this view the vertical support members are of proper width to slide between the pole pieces 16 and 18, but the tolerance is sufficiently close so that the vertical supports prevent lateral movement of the frame. This insures that unintended tilt does not result. The width of the vertical support members serves also to properly space the galvanometer coils 72 between the pole pieces 16 and 18. The galvanometer coils 72 are thus suspended between the faces of the pole pieces substantially equidistant from each face. Input signals may be applied to the galvanometer suspension through terminals 80 and 82 by means of input lines not shown. Connections to the upper terminals 82 may be made by wires laid in a common cable which cable may extend through a suitable opening, not shown, in the cover 26. Connections may be made to the lower terminals 80 by wires in a cable. A suitable plug-in type connector may be employed with the upper terminals if desired, and a plug-in type connector may be employed with the lower terminals.

Figure 4:
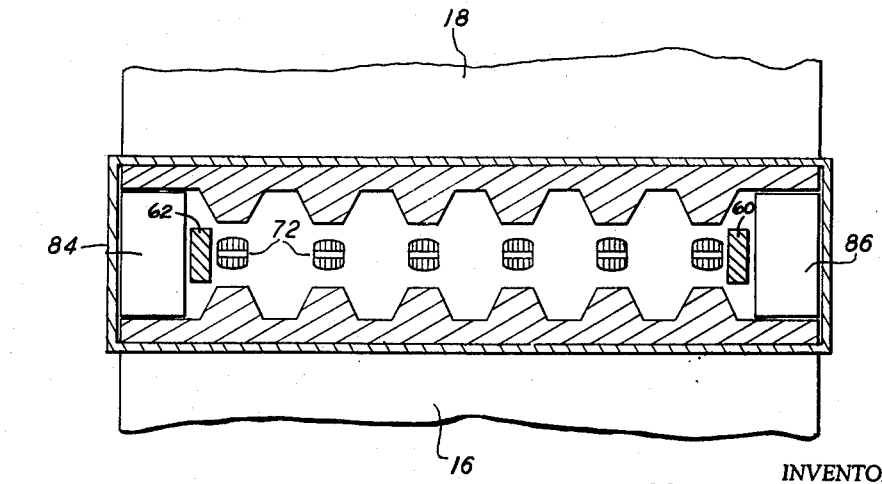
Fig. 4 is a plan view showing the saw-toothed construction of pole pieces taken on the line 4—4 in Fig. 3.

Referring next to Fig. 4 a plan view of the galvanometer mounting arrangement taken on the line 4—4 in Fig. 3 is shown. The face of each pole piece 16 and 18 is serrated as shown, and the galvanometer coils are positioned intermediate the opposing toothed portions of the saw-toothed type construction. In order to compensate for magnetic end effects, a pair of adjustable magnetic shunts 84 and 86 are provided. These shunts are made of soft iron or the like and are adjusted in position between the pole pieces 16 and 18 by suitable means such as a bracket (not shown) to compensate for fringing effects of the magnetic field which would normally occur around either end of the pole pieces in the absence of these shunts. Accordingly they serve to maintain the magnetic field substantially constant between each of the opposing toothed portions of the serrated faces.

Figure 5:
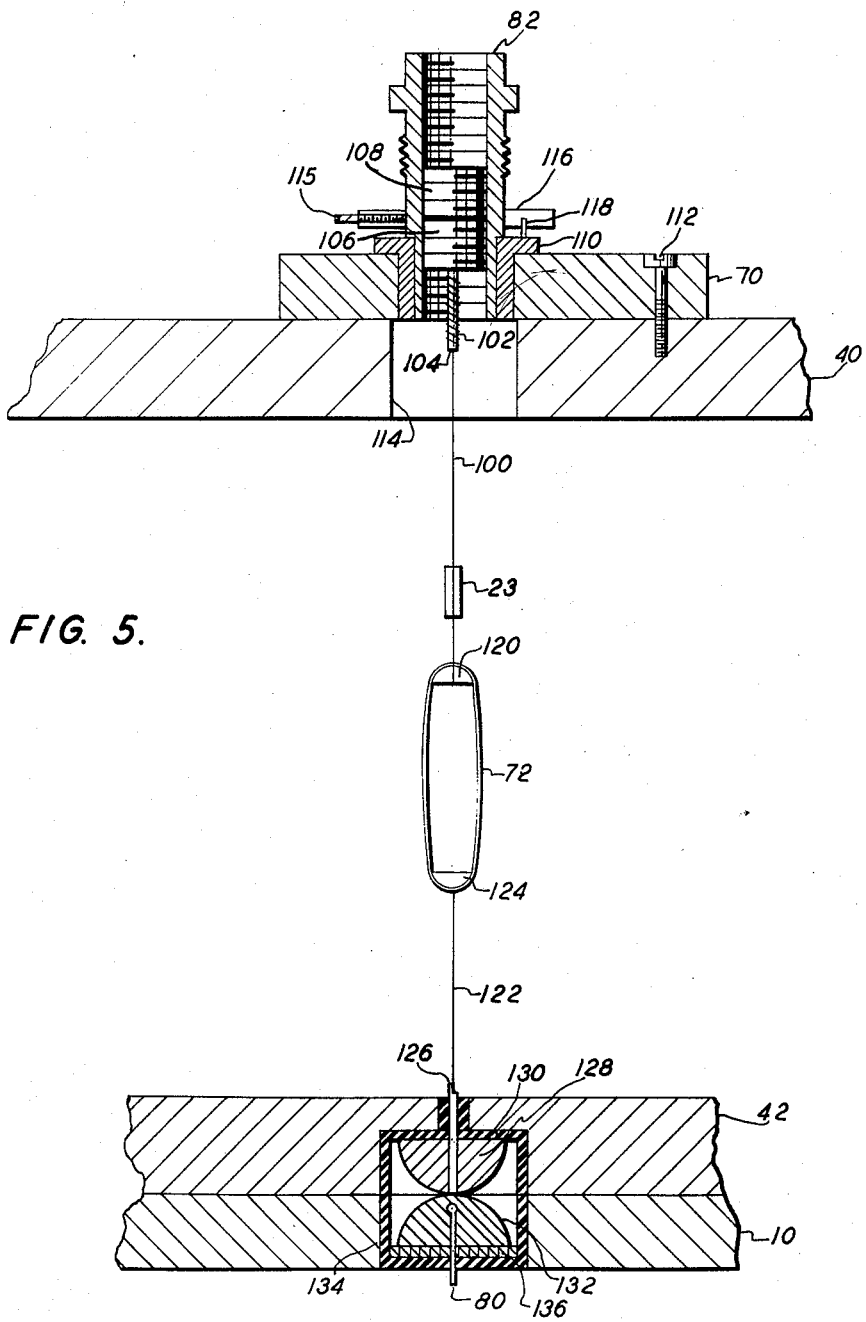
Fig. 5 is an expanded view in cross-section illustrating details of the galvanometer construction.

In Fig. 5 an expanded view of a suspension galvanometer illustrates the details of construction and the cooperation of the suspension with the frame 20. The upper terminal 82 comprises a hollow cylindrical sleeve threaded throughout its inner portion. The upper suspension 100 is attached to a spring 102 fixed on a hollow finger 104 which is secured to a threaded insert 106. A locking nut 108 is provided above the threaded insert 106. The tension of the suspension may be changed by varying the position of the threaded insert 106. If the tension is adjusted when a reference signal is supplied to the galvanometer terminals 80 and 82, standard deflection of the suspended mirror 23 may be obtained. The upper terminal 82 is insulated by means of a support sleeve 110 from the eccentric cam 70. If the screw 112 is loosened, the eccentric cam 70 may be rotated to move the upper suspension back and forth within an aperture 114 in the upper suspension bar 40. As pointed out previously this is used as a vernier adjustment to insure that each galvanometer suspension is initially positioned in a vertical plane. It is sometimes desirable to rotate the suspension about its axis for the purpose of properly placing the mirror 23 in an initial or reference position. This may be accomplished by loosening a set screw 115 and rotating the terminal 82 within a collar 116. A stop pin 118 in this collar fits in a cut-out portion of the insulating support sleeve 110. The stop pin is arranged to permit approximately 180° rotation of the terminal 82 before it engages the extremities of the cut-out portion of the supporting sleeve 110. Thus the stop pin prevents the terminal 82 from being rotated far enough to damage the suspension system carried by it. The terminal 82 is secured in position by friction when the set screw 115 is tightened. Collar 115 is secured to eccentric cam 70 by suitable means such as a bracket (not shown) to maintain the terminal in its secured position.

The upper suspension 100 is looped around a saddle 120 in the upper portion of the coil 72 and supports the coil from the top. A lower suspension 122 is looped around a saddle 124 in the lower portion of the coil 72 and rigidly holds the coil from the bottom. The lower suspension 122 is connected to a terminal 126 to which an electrically conductive cap 128 is secured. The terminal 126 and the cap 128 are insulated by means of a circular member 130 from the lower suspension bar 42. The cap 128 makes electrical contact with another electrically conductive cap 132 insulated from the lower portion 10 of the magnet by means of a circular member 134. The terminal 80 is secured to the cap 132. The cap 132 is flexibly mounted on a spring member 136 whereby it may move up and down to insure electrical contact with the cap 128.

Each galvanometer in the frame 20 is made so that each spring 102 has the same stiffness and flexibility, each upper suspension 100 has the same size and weight, each mirror 23 and coil 72 has the same dimensions and weight and each lower suspension has the same size and weight. Accordingly each suspension has substantially the same overall length, spring rate, mass and moment of inertia. By making the component parts of each galvanometer substantially alike, the response of each is substantially identical after proper tensioning of each suspension is effected by adjusting the threaded insert 106.

The mounting assembly in Fig. 1 may be hermetically sealed by providing a suitable gasket around the inside edges of the cover 26, and suitable end covers, not shown, may be provided to hermetically seal the open end portions of the magnet and pole pieces. Hermetic sealing may be desirable where air currents or other disturbing forces are present in and around the galvanometer support arrangement. The presence of such disturbing air currents may tend to provide undesired deflection or rotation of the galvanometer suspensions.

Accordingly it is seen that a unique mounting arrangement is provided wherein a plurality of galvanometer suspensions are constructed of substantially identical components having like dimensions and weight. Each suspension is initially mounted in a vertical plane and the family of galvanometers is adjusted collectively from the vertical plane to provide the same angle of tilt. The tension of each suspension is individually adjusted so that the response to input signals is substantially the same for each galvanometer. The mounting arrangement is simple in construction and permits the use of parts having normal manufacturing tolerances to be suitably employed. A relatively large number of galvanometer suspensions may be installed per linear inch of magnet, thereby providing a compact unit. With a family of such galvanometers having substantially identical responses, galvanometer error in phase angle of lag is minimized, and measurements requiring related data such as geophysical measurements, air frame readings, electrical power station instrumention and the like are facilitated.

What is claimed is:

1. A device for mounting galvanometers comprising a frame including horizontally extending upper and lower support members with vertical support members therebetween; a plurality of galvanometers each including a spring, coil and mirror of like dimensions and weight suspended by suspensions of equal length, said suspensions being separately anchored at opposite ends to the horizontally extending upper and lower support members of the frame respectively; individual means mounted on the frame for adjusting the tension of each suspension galvanometer; means slidably connecting one horizontally extending support member to said vertical support members and enabling transverse horizontal displacements of one horizontally extending support member relative to the other horizontally extending support member, said horizontal displacements acting to adjust the angle of tilt of the plurality of galvanometers as a group; a magnet; and a pair of pole pieces, said pole pieces being associated with said magnet and being disposed on opposite sides of the coil of each suspended galvanometer, whereby a family of galvanometers having substantially identical responses is provided.

2. The device of claim 1 wherein the pole pieces have saw-tooth-shaped edges with the tooth-shaped portions disposed in opposing relationship and wherein said galvanometer coils are disposed between the opposed tooth-shaped portions of said pole pieces.

3. The device of claim 1 wherein the frame includes members transverse to the lower support member of the frame, said transverse member slidably engaging the magnet poles so as to prevent tilting of the frame with respect to the magnet.

4. A device for making simultaneous investigation of several parameters occurring together in time comprising a magnet having two poles; a pair of pole pieces, each pole piece being secured to an associated pole of said magnet; a frame removably supported between the pole pieces of said magnet and including upper and lower horizontal support members with vertical support members therebetween, one horizontal support member being movable with respect to the other horizontal support member; a plurality of galvanometers each including a spring, mirror and coil of like weight and dimensions suspended by suspensions of equal length, said coil of each galvanometer being disposed between said pole pieces, said suspensions being separately anchored at opposite ends to the upper and lower horizontal support members of the frame respectively, means joining one horizontal support member to a part of the frame and enabling transverse horizontal displacements of said horizontal support member relative to the other horizontal support member, said horizontal displacements acting to adjust collectively the angle of tilt of all galvanometers; means on one of the horizontal support members for making fine adjustments of the angle of tilt of each of the galvanometers separately; and means for adjusting the tension of each galvanometer suspension separately, whereby a family of galvanometers having substantially the same response is secured.

References Cited in the file of this patent
UNITED STATES PATENTS

| 1,930,677 | Floyd | Oct. 17, 1933 |
| 1,981,266 | Green | Nov. 20, 1934 |
| 2,282,590 | Miller | May 12, 1942 |
| 2,389,081 | Redmond | Nov. 13, 1945 |
| 2,599,661 | Richardson | June 10, 1952 |
| 2,678,424 | Heiland | May 11, 1954 |